(12) United States Patent
Horiuchi

(10) Patent No.: US 12,223,200 B2
(45) Date of Patent: Feb. 11, 2025

(54) INFORMATION PROCESSING SYSTEM

(71) Applicant: Maruichi Warehouse Co., Ltd., Yamanashi (JP)

(72) Inventor: Makoto Horiuchi, Kofu (JP)

(73) Assignee: Maruichi Warehouse Co., Ltd., Yamanashi (JP)

( * ) Notice: Subject to any disclaimer, the term of this patent is extended or adjusted under 35 U.S.C. 154(b) by 58 days.

(21) Appl. No.: 17/995,247

(22) PCT Filed: Apr. 1, 2021

(86) PCT No.: PCT/JP2021/014218
§ 371 (c)(1),
(2) Date: Sep. 30, 2022

(87) PCT Pub. No.: WO2021/201246
PCT Pub. Date: Oct. 7, 2021

(65) Prior Publication Data
US 2023/0168837 A1 Jun. 1, 2023

(30) Foreign Application Priority Data
Apr. 2, 2020 (JP) .................................. 2020-066650

(51) Int. Cl.
*G06F 3/16* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC .... G06F 3/0604; G06F 3/0655; G06F 3/0671; G06F 3/0673; G06Q 10/08;
(Continued)

(56) References Cited

U.S. PATENT DOCUMENTS

2019/0080284 A1 3/2019 Kim et al.
2019/0199534 A1* 6/2019 Beaman ................ H04W 4/029
(Continued)

FOREIGN PATENT DOCUMENTS

| JP | WO2002/029654 A1 | 2/2004 |
| JP | 2019-073394 A | 5/2019 |
| JP | WO2018/155719 A1 | 11/2019 |

OTHER PUBLICATIONS

Mizutani, Makiko; "Expectations and Technical Issues for a Decentralized Society Using Blockchain Technology"; Internet: <URL:https://www.mizuho-ir.co.jp/publication/report/2018/pdf/mhir16_bc.pdf>; Published on Nov. 2018; Retrieved on Apr. 20, 2021; pp. 6-8 ; with partial English translation.
(Continued)

*Primary Examiner* — Ilwoo Park
(74) *Attorney, Agent, or Firm* — Studebaker & Brackett PC

(57) ABSTRACT

The objective of the present invention is to efficiently manage data required to verify the loading waiting time of a logistics contractor (truck driver), while ensuring the accuracy of the data. A metadata storage control unit 103 executes control to cause metadata relating to main data to be stored on a network N using blockchain technology or distributed ledger technology. A main data storage control unit 104 executes control to associate linking data linking metadata stored on the network N and the main data with the main data, and to store the same in a main data database 181 on a server 1.

11 Claims, 13 Drawing Sheets

(58) Field of Classification Search
CPC .............. G06Q 10/083; G06Q 10/0833; G06Q 10/0835; G06Q 10/08355; G06Q 10/0836; G06Q 10/087
USPC .......... 705/330, 333, 336, 337, 338; 711/154
See application file for complete search history.

(56) References Cited

U.S. PATENT DOCUMENTS

2019/0303854 A1* 10/2019 O'Brien .................. H04N 5/765
2020/0153889 A1* 5/2020 Lee .......................... H04L 67/06
2022/0044232 A1* 2/2022 Vintila .................. G06Q 20/389

OTHER PUBLICATIONS

Business Communication; "NTT Service Evolution Laboratories to Creating New Value in Society and Environment"; Japan, Business Communication, vol. 56, No. 9; pp. 50-51; Published on Sep. 1, 2019; with partial English translation.

International Search Report issued in PCT/JP2021/014218; mailed Apr. 27, 2021.

Yoshinobu Shijo, "The Current Status and Challenges of Applying Blockchain to IoT", Dec. 26, 2019, pp. 1-36, the Internet <URL:https://www.ieice.org/dpf/wp-content/uploads/2019/10/DPF201912-02.pdf>; with English translation.

An Office Action; "Notice of Reasons for Refusal," mailed by the Japanese Patent Office on Nov. 12, 2024, which corresponds to Japanese Patent Application No. 2022-048841 and is related to U.S. Appl. No. 17/995,247; with English language translation.

* cited by examiner

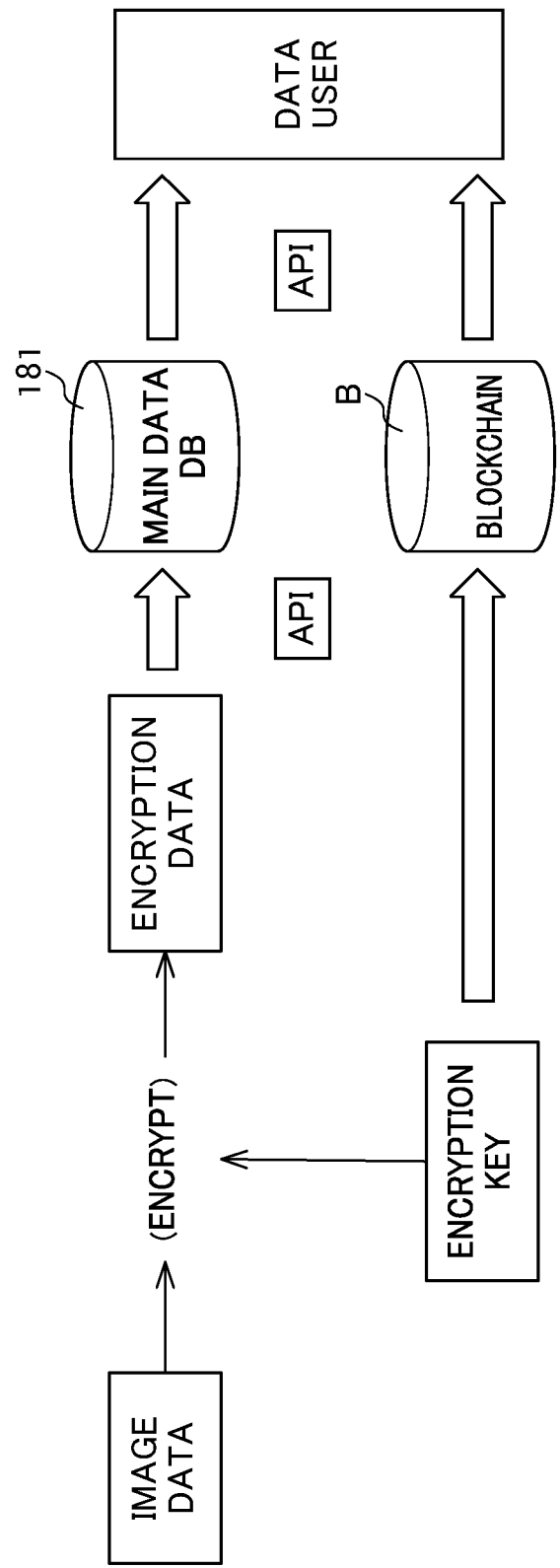

INFORMATION PROCESSING SYSTEM

TECHNICAL FIELD

The present invention relates to an information processing system.

BACKGROUND ART

A technique for achieving efficient distribution has conventionally existed. For example, there also exists a technique in which information about, for example, a movement route to a hand-off point of a package and a period of time required to load the package onto a truck is provided from a sender to a distribution service provider (for example, Patent Document 1).

Patent Document 1: Domestic re-publication of PCT international application No. 2002/029654

DISCLOSURE OF THE INVENTION

Problems to be Solved by the Invention

However, a distribution service provider (truck driver) must often wait at a package collecting point due to the convenience of a sender side. Such waiting time refers to "loading waiting time", which is one of causes of excessive fatigue of the distribution service provider (truck driver). For example, in Ministerial Ordinance of the Ministry of Land, Infrastructure, Transport and Tourism of Japan, a distribution service provider's (truck driver's) act of waiting at a package collecting point due to the convenience of the sender side is defined as an example of "distribution service provider's acts leading to excessive fatigue driving" (Transport safety regulations Article 9-4). The recordkeeping obligation of the loading waiting time is imposed on the distribution service provider at the request to comply with provisions including the foregoing provision of the Ministerial Ordinance. Therefore, it is required to accurately and efficiently manage the loading waiting time. In contrast, in the conventional techniques including the invention disclosed in Patent Document 1, it is impossible to accurately and efficiently manage the loading waiting time.

The present invention has been made in view of such circumstances, and an object thereof is to efficiently manage data required to verify loading waiting time of a distribution service provider (truck driver), while ensuring accuracy of the data.

Means for Solving the Problems

In order to achieve the above-described object, an information processing system of an aspect of the present invention includes: a first storage control unit that links main data and metadata relating to the main data to execute control to cause the metadata to be stored on a predetermined network using blockchain technology or distributed ledger technology; and a second storage control unit that executes control to cause the main data to be stored in a predetermined storage medium different from a storage medium of the metadata.

Effects of the Invention

The present invention makes it possible to efficiently manage data required to verify loading waiting time of a distribution service provider (truck driver), while ensuring accuracy of the data.

BRIEF DESCRIPTION OF THE DRAWINGS

FIG. 13 is a diagram illustrating further specific examples of main data and metadata to be managed by the present service.

PREFERRED MODE FOR CARRYING OUT THE INVENTION

Hereinafter, embodiments of the present invention will be described with reference to the drawings.

First Embodiment

Figure 1:
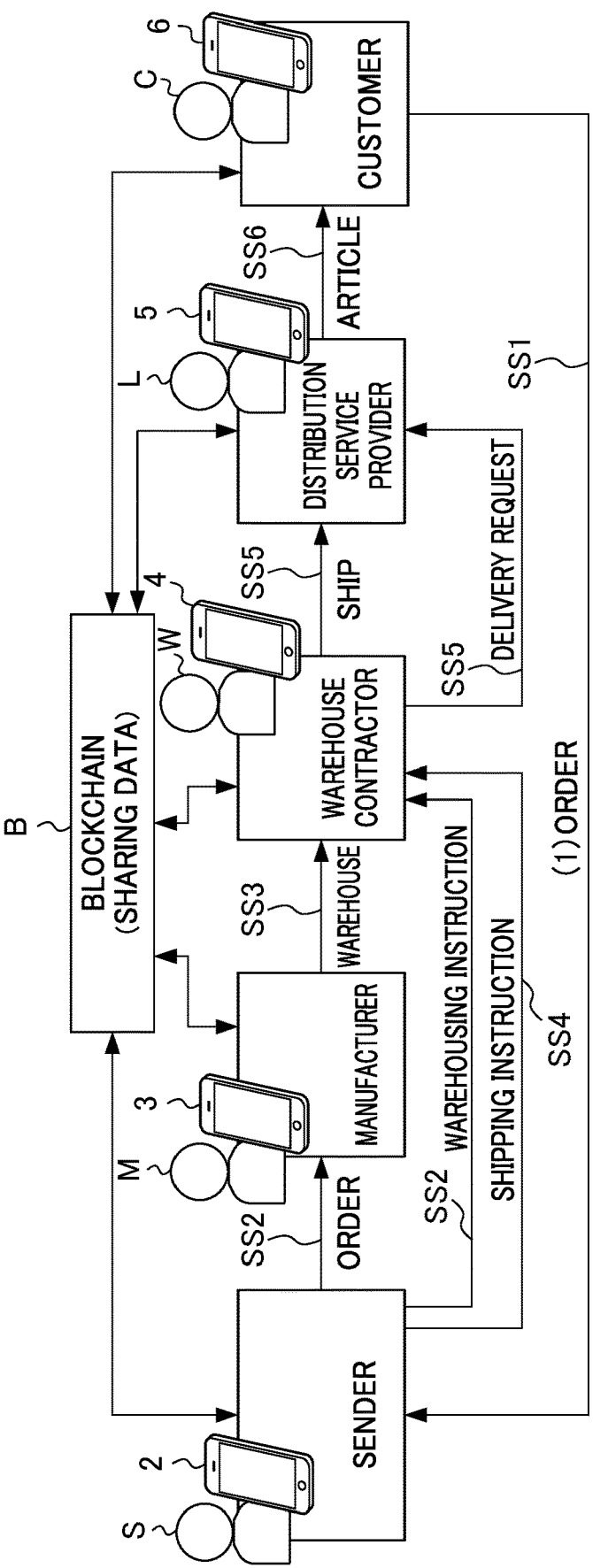
FIG. 1 is a schematic diagram illustrating an example of an overview of service applicable by an information processing system according to a first embodiment of the present invention.

FIG. 1 is a schematic diagram illustrating an example of an overview of service (hereinafter, referred to as the "present service") applicable by an information processing system according to a first embodiment of the present invention.

As illustrated in FIG. 1, the present service is service that is provided by a service provider (not illustrated), and is used by a sender S, a manufacturer M, a warehouse contractor W, a distribution service provider L, and a customer C.

The service provider (not illustrated) is a person who uses a server 1. The service provider (not illustrated) provides an environment to manage various types of data to be transmitted and received mutually among the sender S, the manufacturer M, the warehouse contractor W, the distribution service provider L, and the customer C. The sender S is a person who operates a sender terminal 2 to use the present service. Upon receipt of an order for a product from the customer C, the sender S orders an order for manufacturing of the product with the manufacturer M. The manufacturer M is a person who operates a manufacturer terminal 3 to use the present service. Upon receipt of the order for the product from the sender S, the manufacturer M manufactures the product. The warehouse contractor W is a person who operates a warehouse contractor terminal 4 to use the present service. Upon receipt of a warehousing instruction from the sender S, the warehouse contractor W warehouses the product manufactured by the manufacturer M in the in-house warehouse and manages the product. The warehouse contractor W ships, from the warehouse, the product stored in the warehouse according to a shipping instruction from the sender S. The distribution service provider L is a person who operates a distribution service provider terminal 5 to use the present service. Upon receipt of a delivery request from the warehouse contractor W, the distribution service provider L delivers, to the customer C, the product shipped from the warehouse.

The server 1 to be used by the service provider (not illustrated) executes various types of processing necessary for providing the present service in cooperation with the sender terminal 2, the manufacturer terminal 3, the warehouse contractor terminal 4, the distribution service provider terminal 5, and the customer terminal 6. That is, the service provider (not illustrated) can provide, using the server 1, the present service that manages various types of data to be transmitted and received mutually among the sender S, the manufacturer M, the warehouse contractor W, the distribution service provider L, and the customer C.

Hereinafter, an overview of a flow of the present service will be described along steps SS1 to SS6 of FIG. 1. In step SS1, the customer C orders a product from the sender S. The sender S receives the order for the product from the customer C. At this time, various types of data showing contents of the order for the product, which have been exchanged between the customer C and the sender S, are stored, as main data, in the server 1. Metadata relating to the main data is stored in a blockchain B. Here, the "metadata" includes information indicating location and date and time at which the main data is created, for example. Note that examples of the "various types of data showing contents of the order for the product" include PDF data of an order form prepared by the customer C and PDF data of a received order form prepared by the sender S.

In step SS2, the sender S orders, with the manufacturer M, an order for manufacturing of the product for which the order has been received from the customer C. The sender S issues, to the warehouse contractor W, a warehousing instruction of the product. Upon receipt of the order for the product from the sender S, the manufacturer M manufactures the product. At this time, various types of data showing contents of the order and received order for the product, which have been exchanged between the sender S and the manufacturer M, are stored, as main data, in the server 1. Metadata relating to the main data is stored in the blockchain B. Note that examples of the "various types of data showing contents of the order and received order for the product" include PDF data of an order form prepared by the sender S and PDF data of a received order form prepared by the manufacturer M.

In step SS3, the manufacturer M warehouses the manufactured product in the warehouse of the warehouse contractor W. At this time, various types of data showing contents of warehousing of the product, which have been exchanged between the manufacturer M and the warehouse contractor W, are stored, as main data, in the server 1. Metadata relating to the main data is stored in the blockchain B. Note that examples of the "various types of data showing contents of warehousing of the product" include data of a photograph showing a status in which the product is warehoused, the photograph being taken by the manufacturer M, PDF data of the order form, and PDF data of a document that shows the warehousing, the document being prepared by the warehouse contractor W.

In step SS4, the sender S issues, to the warehouse contractor W, a shipping instruction of the product stored in the warehouse. At this time, various types of data showing contents of the shipping instruction of the product, which have been exchanged between the sender S and the warehouse contractor W, are stored, as main data, in the server 1. Metadata relating to the main data is stored in the blockchain B. Note that examples of the "various types of data showing contents of the shipping instruction of the product" include PDF data of an instruction prepared by the sender S.

In step SS5, the warehouse contractor W requests the delivery of the product stored in the warehouse from the distribution service provider L and ships the product stored in the warehouse. At this time, various types of data showing contents of each of the shipment of the product and the delivery request, which have been exchanged between the warehouse contractor W and the distribution service provider L, are stored, as main data, in the server 1. Metadata relating to the main data is stored in the blockchain B. Note that examples of the "various types of data showing contents of the shipment of the product and the delivery request" include data of a photograph showing a status of the shipment of the product, the photograph being captured by the warehouse contractor W, and PDF data of a request form prepared by the warehouse contractor W.

In step SS6, the distribution service provider L delivers the product to the customer C. At this time, various types of data showing contents of the delivery of the product, which have been exchanged between the distribution service provider L and the customer C, are stored, as main data, in the server 1. Metadata relating to the main data is stored in the blockchain B. Note that examples of the "various types of data showing contents of the delivery of the product" include PDF data of a document with a reception sign of the customer C that shows the completion of the delivery.

In this way, the present service has a feature in that the main data is stored in the server 1 and the metadata relating to the main data is stored in the blockchain B to thereby allow the data to be shared among users. That is, in the present service, the metadata relating to the main data is extracted separately from the main data, and the metadata is stored on the network using the blockchain technology or the distributed ledger technology. Then, in the server 1, data (hereinafter, referred to "linking data") for linking the main data and the metadata is created, and is stored in association with the main data. In this way, the main data stored in the server 1 and the metadata stored in the blockchain B are managed to be associated with each other.

A person who uses the present service can obtain the following benefit from the above-described feature of the present service. That is, in the case where the main data is used as materials to be presented to public offices, for example, the accuracy of the contents of the main data is naturally required. One of effective methods for ensuring the accuracy of the main data is to manage the main data using the blockchain technology or the distributed ledger technology. However, in the case where the method is used to store the main data, the processing speed is reduced when the volume of the data to be stored is large. Therefore, in the present service, the main data is stored in the server 1, and the metadata of a small volume is stored in the blockchain B. The linking data linking both of the main data and the metadata is stored in the server 1 in association with the main data. The metadata stored in the blockchain B can be prevented from being tampered, and therefore, if there is no discrepancy between the contents of the metadata and the contents of the main data, the accuracy of the contents of the main data can be ensured by the metadata. This enables the main data to be efficiently managed without causing the main data to be stored in the blockchain B.

Figure 2:
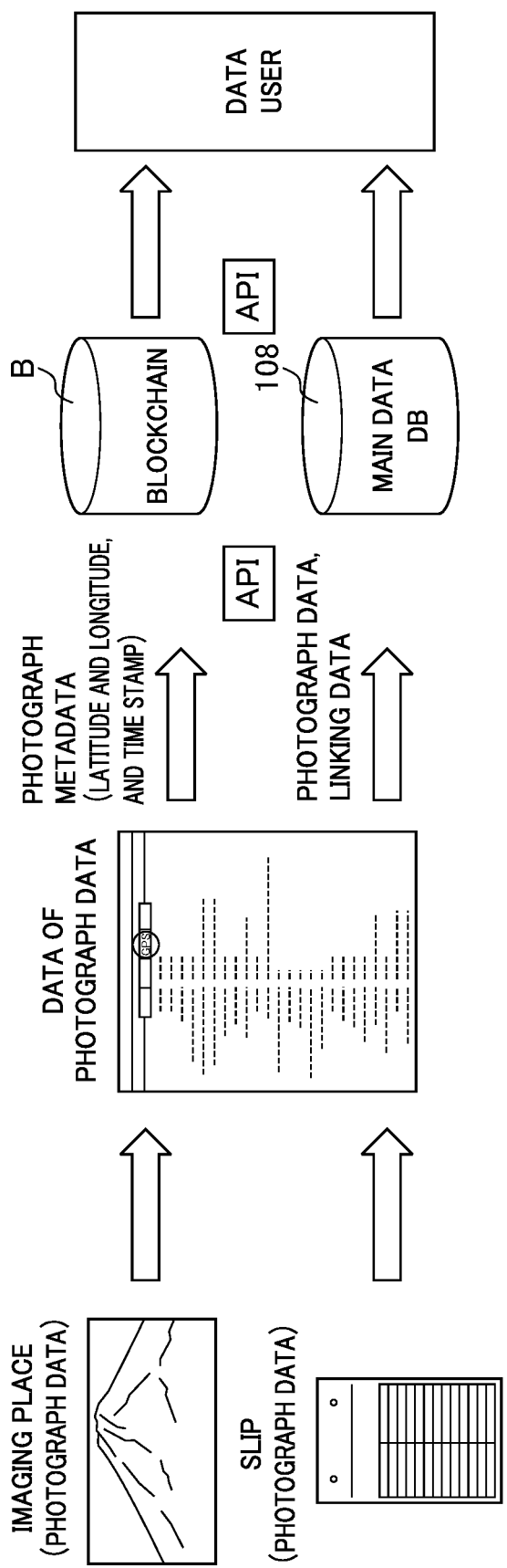
FIG. 2 is a diagram illustrating specific examples of main data and metadata to be managed by the present service.

Next, specific examples of the main data and the metadata will be described with reference to FIG. 2. FIG. 2 is a diagram illustrating the specific examples of the main data and the metadata to be managed by the present service.

In FIG. 2, as the specific examples of the main data, there are illustrated data (photograph data) of an image showing an imaging location and data (photograph data) of an image obtained by imaging a slip describing contents of a transaction. In these two pieces of data, information indicating a position where the image has been captured and information indicating date and time when the image has been captured are included as the metadata. Specifically, for example, latitude and longitude of the imaging location shown by Global Positioning System (GPS) position information and a time stamp indicating imaging date and time are included as the metadata. In the present service, these pieces of metadata are extracted from the main data, and are stored in the blockchain B via an application programming interface (API). Therewith, the main data and the linking data are also stored in the server 1 in association with each other. This enables the main data and the metadata to be linked to each other by the linking data, whereby data users can refer to and use the main data at any time. Here, the "data users" include the sender S, the manufacturer M, the warehouse contractor W, the distribution service provider L, and the customer C of FIG. 1, which are users of the present service.

Figure 3:
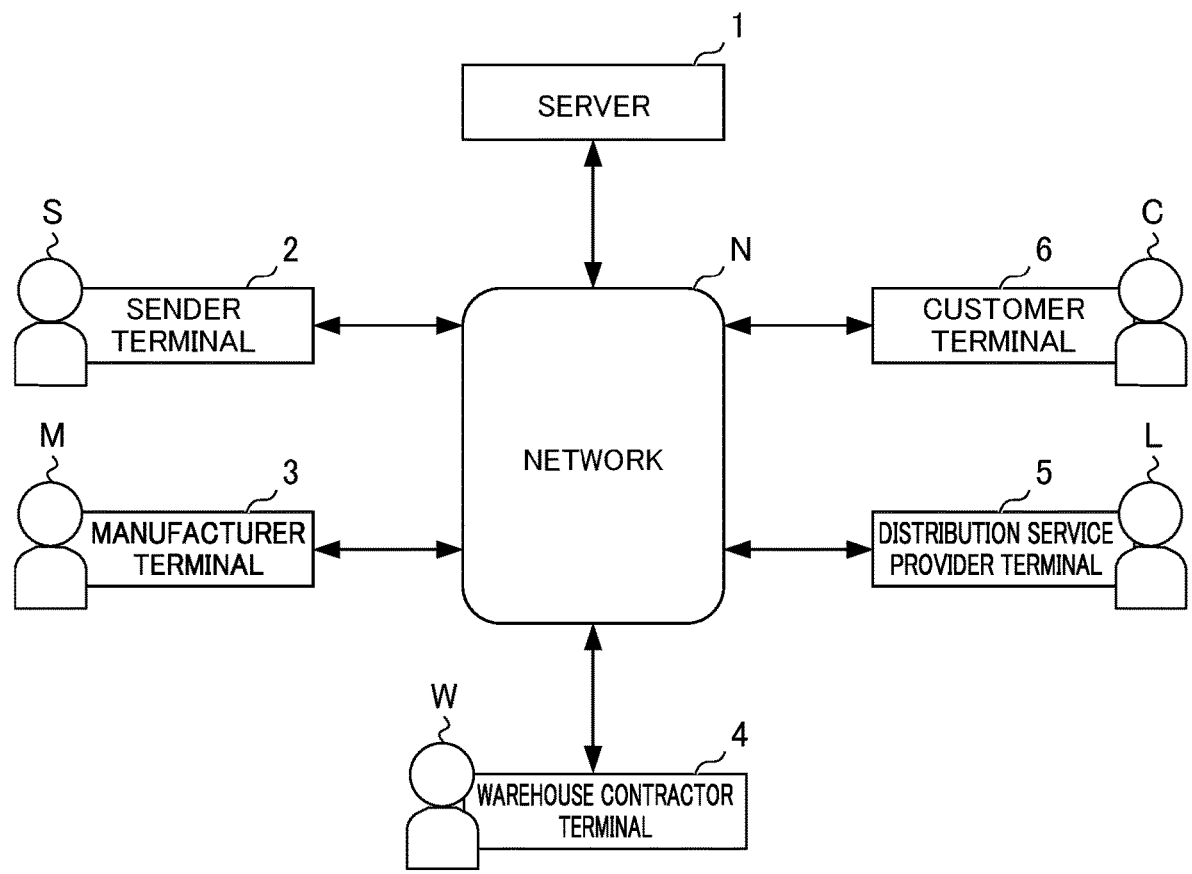
FIG. 3 is a block diagram illustrating an example of a configuration of the information processing system according to the first embodiment of the present invention.

FIG. 3 is a block diagram illustrating an example of a configuration of the information processing system according to the first embodiment of the present invention.

In the information processing system illustrated in FIG. 3, the server 1, the sender terminal 2, the manufacturer terminal 3, the warehouse contractor terminal 4, the distribution service provider terminal 5, and the customer terminal 6 are connected to one another via a predetermined network N such as an Internet.

To use the present service, each of the sender S, the manufacturer M, the warehouse contractor W, the distribution service provider L, and the customer C installs application software dedicated for the present service (hereinafter, referred to a "dedicated application") on the terminal to be operated by oneself. Specifically, the dedicated application is installed on each of the sender terminal 2, the manufacturer terminal 3, the warehouse contractor terminal 4, the distribution service provider terminal 5, and the customer terminal 6. This enables the sender S, the manufacturer M, the warehouse contractor W, the distribution service provider L, and the customer C to use the present service by operating the sender terminal 2, the manufacturer terminal 3, the warehouse contractor terminal 4, and the distribution service provider terminal 5, respectively. In addition, each of the sender S, the manufacturer M, the warehouse contractor W, the distribution service provider L, and the customer C can use the present service by accessing a web site dedicated for the present service (hereinafter, referred to a "dedicated site") via the terminal to be operated by oneself. Specifically, the sender S, the manufacturer M, the warehouse contractor W, the distribution service provider L, and the customer C access the dedicated site using respective browser functions of the sender terminal 2, the manufacturer terminal 3, the warehouse contractor terminal 4, and the distribution service provider terminal 5. Although FIG. 3 illustrates, as an example, one server 1, one sender terminal 2, one manufacturer terminal 3, one warehouse contractor terminal 4, one distribution service provider terminal 5, and one customer terminal 6 for convenience of description, the present invention is not limited thereto, and a structure provided with a plurality of servers 1, sender terminals 2, manufacturer terminals 3, warehouse contractor terminals 4, distribution service provider terminals 5, and customer terminals 6 may be employed. That is, a plurality of senders S, manufacturers M, warehouse contractors W, distribution service providers L, customers C may be present. A case where a plurality of senders S, manufacturers M, warehouse contractors W, distribution service providers L, customers C are present will be described later with reference to FIG. 12.

Figure 4:
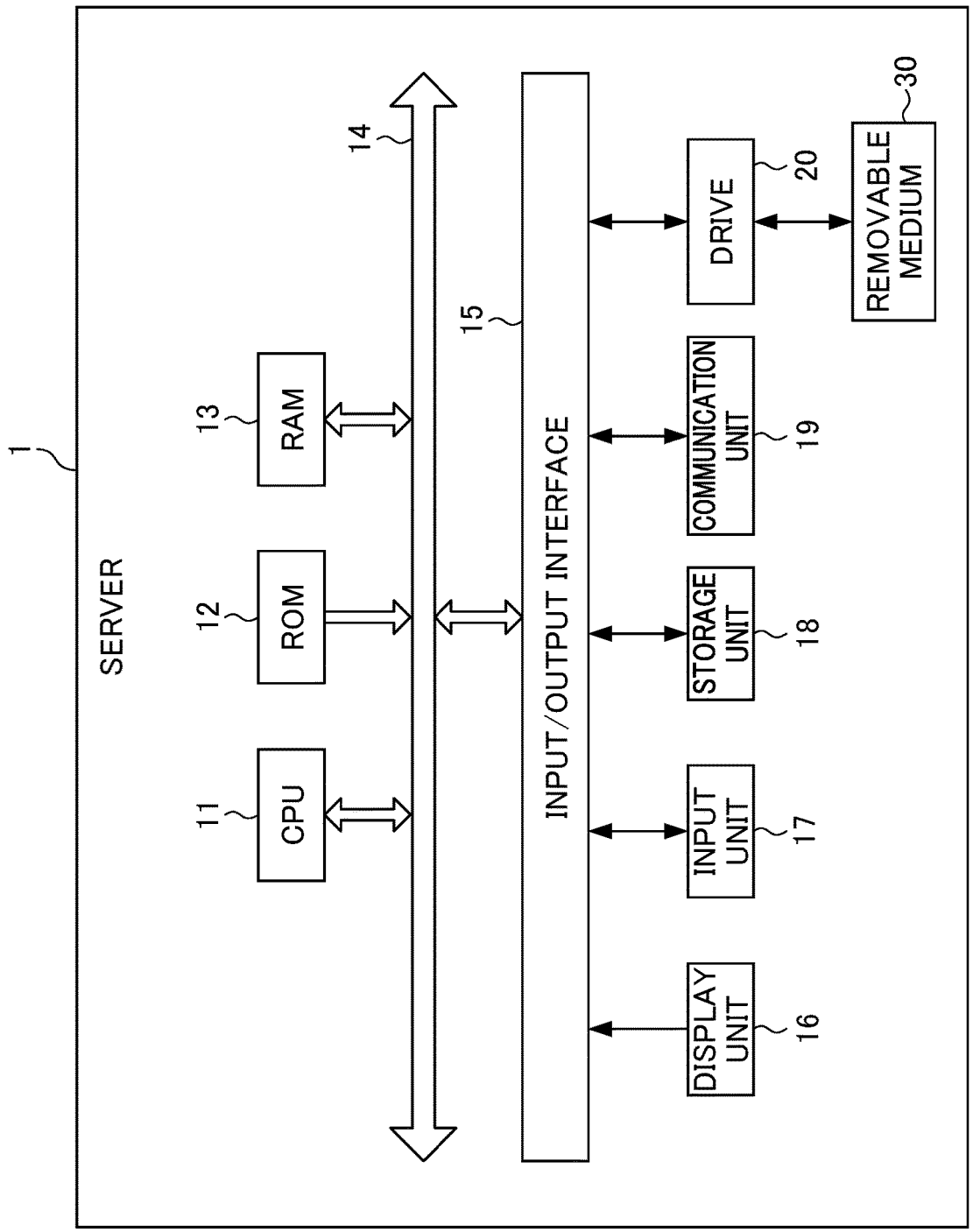
FIG. 4 is a block diagram illustrating a hardware configuration of a server in the information processing system of FIG. 3.

FIG. 4 is a block diagram illustrating a hardware configuration of the server in the information processing system of FIG. 3.

The server 1 includes a central processing unit (CPU) 11, read only memory (ROM) 12, random access memory (RAM) 13, a bus 14, an input/output interface 15, a display unit 16, an input unit 17, a storage unit 18, a communication unit 19, and a drive 20.

The CPU 11 executes various types of processing according to a program recorded in the ROM 12 or a program loaded from the storage unit 18 to the RAM 13. The RAM 13 also stores data necessary for the CPU 11 to execute various types of processing, as appropriate.

The CPU 11, the ROM 12, and the RAM 13 are connected to one another via the bus 14. The input/output interface 15 is also connected to the bus 14. The display unit 16, the input unit 17, the storage unit 18, the communication unit 19, and the drive 20 are connected to the input/output interface 15.

The display unit 16 is constituted by a display, and displays various images. The input unit 17 includes various types of hardware or the like, and inputs various types of information. The storage unit 18 includes a hard disk, dynamic random access memory (DRAM), or the like, and stores various types of data. The communication unit 19 controls communication performed with other devices (for example, the sender terminal 2, the manufacturer terminal 3, the warehouse contractor terminal 4, the distribution service provider terminal 5, and the customer terminal 6 in FIG. 3) via the network N including the Internet.

The drive 20 is provided if necessary. A removable medium 30 including a magnetic disk, an optical disc, a magneto-optical disk, a semiconductor memory, or the like is appropriately mounted on the drive 20. A program read from the removable medium 30 by the drive 20 is installed in the storage unit 18 if necessary. The removable medium 30 can also store various types of data stored in the storage unit 18, similarly to the storage unit 18.

Hardware configurations of the sender terminal 2, the manufacturer terminal 3, the warehouse contractor terminal 4, the distribution service provider terminal 5, and the customer terminal 6 are basically similar to the configuration of the server 1. Therefore, description thereof is omitted here.

Various types of processing to be described later are performed by cooperation of various types of hardware and software of the server 1, the sender terminal 2, the manufacturer terminal 3, the warehouse contractor terminal 4, the distribution service provider terminal 5, and the customer terminal 6 of FIG. 3.

Figure 5:
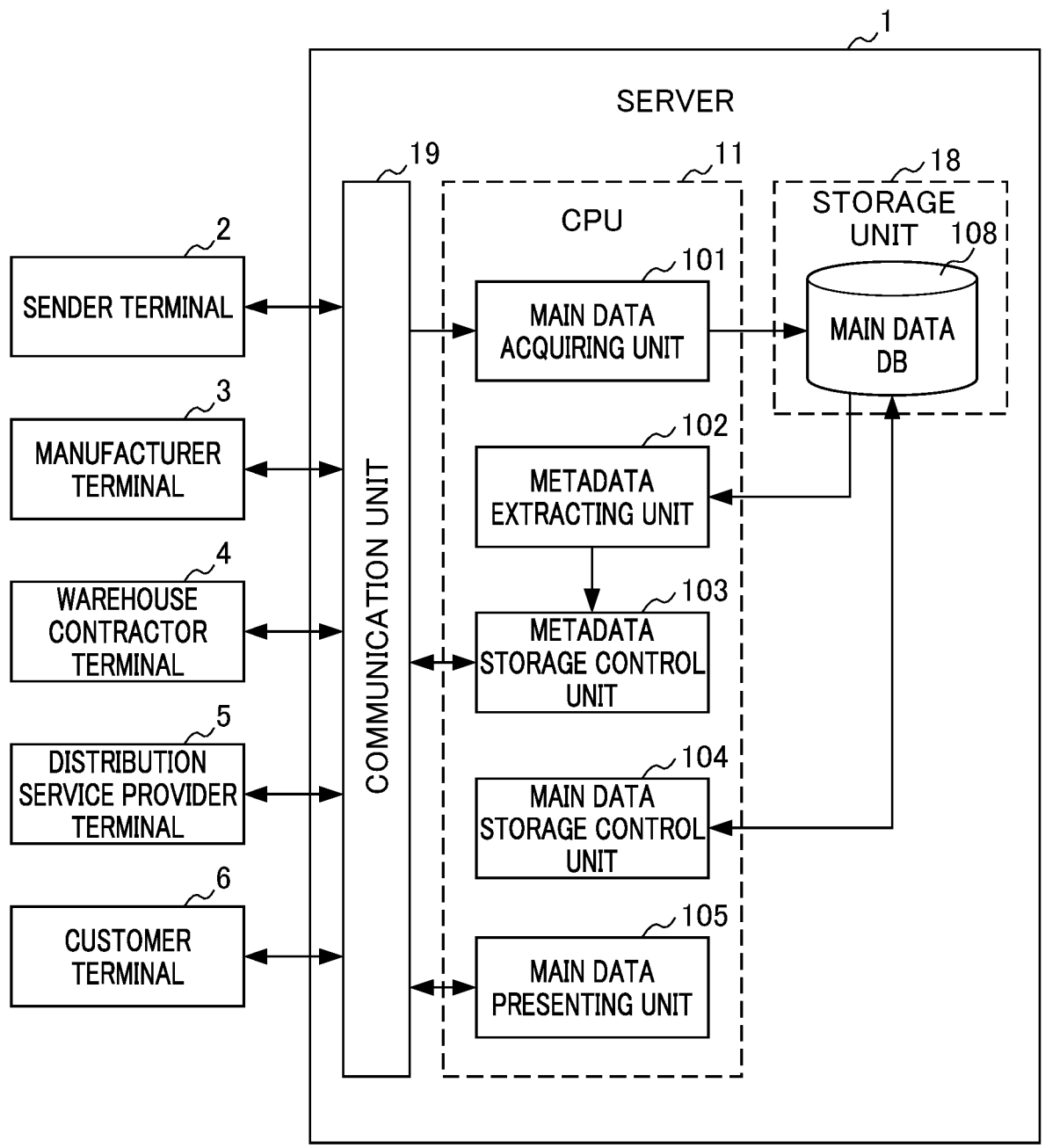
FIG. 5, is a functional block diagram illustrating a functional configuration for executing data management processing in a functional configuration of the server of FIG. 4.

FIG. 5 is a functional block diagram illustrating a functional configuration for executing data management processing in a functional configuration of the server of FIG. 4. Here, the "data management processing" refers to processing to be executed to manage various types of data (hereinafter, referred to as "main data") to be transmitted and received mutually among the sender S, the manufacturer M, the warehouse contractor W, the distribution service provider L, and the customer C of FIG. 1, which are users of the present service.

When the data management processing is executed, in the CPU 11 of the server 1, a main data acquiring unit 101, a metadata extracting unit 102, a metadata storage control unit 103, and a main data storage control unit 104 function as illustrated in FIG. 5.

The main data acquiring unit 101 acquires created main data. Specifically, the main data acquiring unit 101 acquires, as the main data, data showing contents of at least one transaction selected from a transaction related to an order for a product, a transaction related to an instruction to warehouse the product in a warehouse, a transaction related to an instruction to ship the product from the warehouse, and a transaction related to a request to deliver the product to a delivery destination, the data being created when making the at least one transaction.

The metadata extracting unit 102 extracts metadata relating to the main data acquired by the main data acquiring unit 101. Specifically, the metadata extracting unit 102 extracts, as the metadata, information indicating a position and date and time at which the main data is created.

The metadata storage control unit 103 executes control to cause the metadata extracted by the metadata extracting unit 102 to be stored on the network N using the blockchain technology or the distributed ledger technology.

The main data storage control unit 104 executes control to associate linking data linking the metadata stored on the network N and the main data with the main data and to store the linking data and the main data in a main data DB 181.

Second Embodiment

Figure 6:
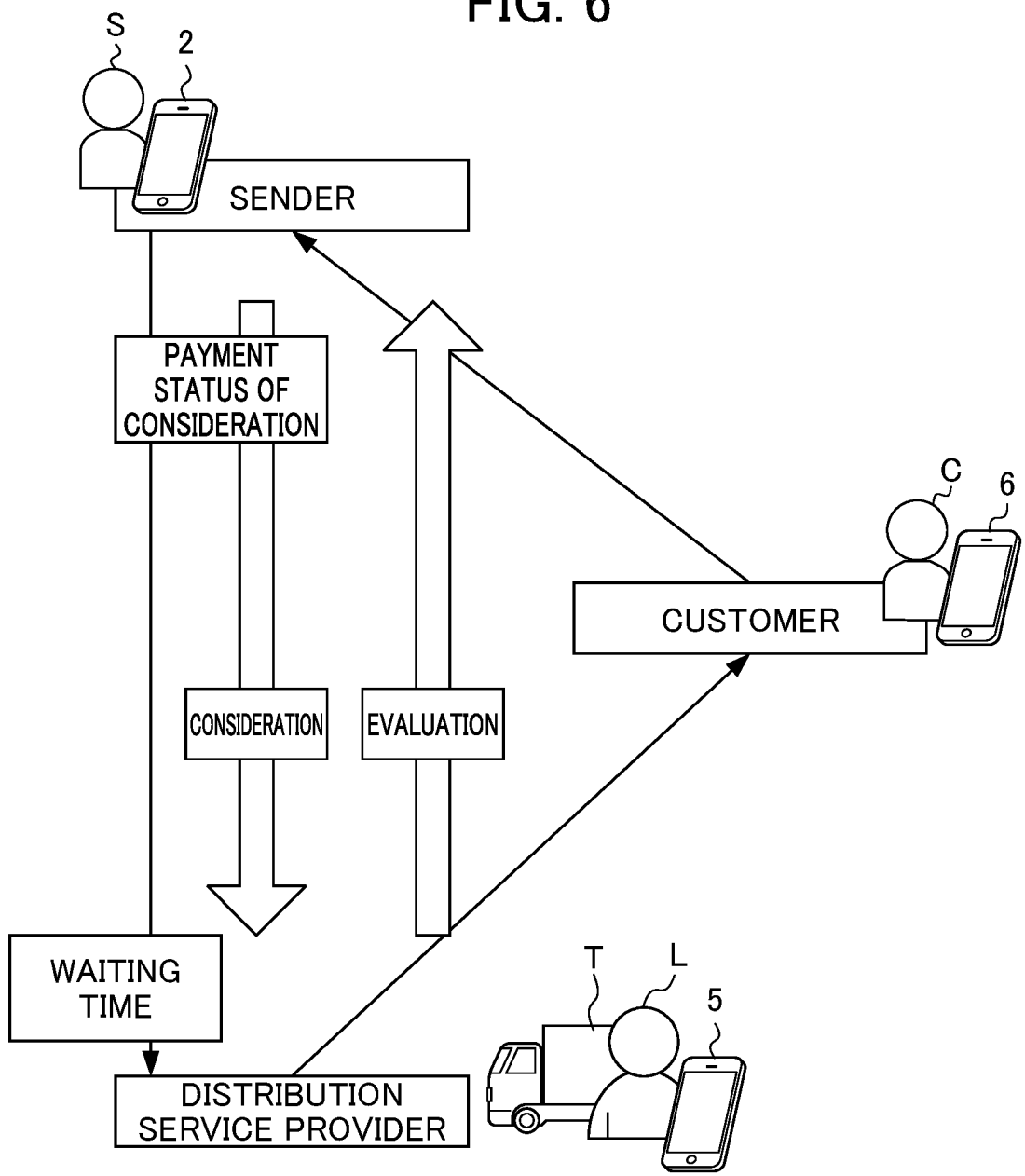
FIG. 6 is a schematic diagram illustrating an example of an overview of service applicable by an information processing system according to a second embodiment of the present invention.
Figure 7:
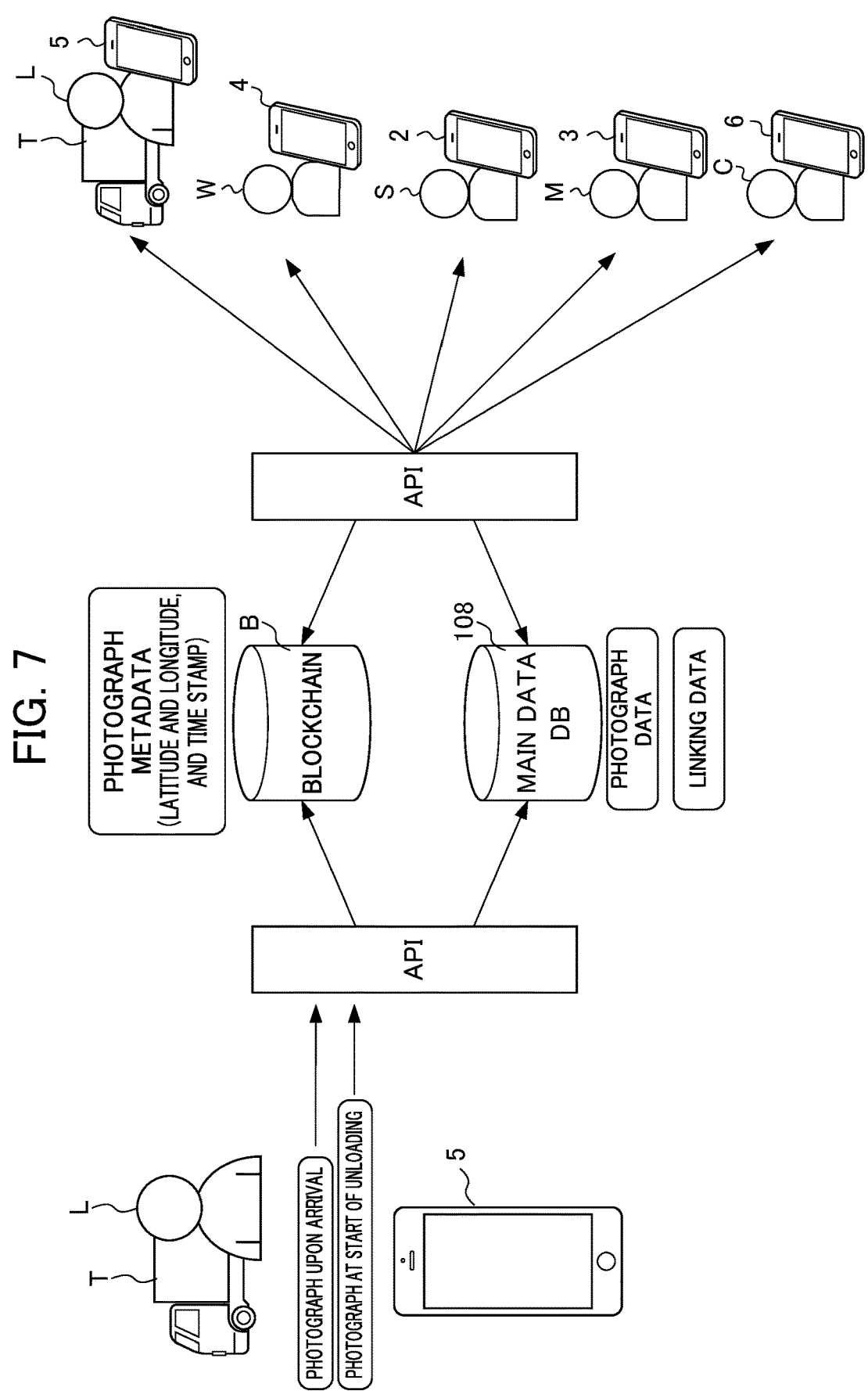
FIG. 7 is a schematic diagram illustrating an example of an overview of the service applicable by the information processing system according to the second embodiment of the present invention.

Each of FIGS. 6 and 7 is a schematic diagram illustrating an example of an overview of service (hereinafter, referred to as the "present service") applicable by an information processing system according to a second embodiment of the present invention.

Note that, an example of a configuration of the information processing system and a hardware configuration of a server 1 according to the second embodiment are similar to the system configuration of FIG. 3 and the hardware configuration of FIG. 4, respectively. Therefore, the configuration of the information processing system according to the second embodiment to which the server 1 is applied and the hardware configuration of the server 1 will not be described.

FIG. 6 illustrates an overview of evaluation for a sender S by a distribution service provider L, the evaluation being performed by the present service.

As illustrated in FIG. 6, the present service is service that is provided by a service provider (not illustrated), and is used by the sender S, the distribution service provider L, and a customer C.

The service provider (not illustrated) is a person that manages the server 1 to provide an environment that can properly and efficiently manage data related to the evaluation for the sender S, the data being transmitted and received mutually among the sender S, the distribution service provider L, and the customer C. The sender S is a person who operates a sender terminal 2 to use the present service. Upon receipt of an order for a product from the customer C, the sender S requests the distribution service provider L to deliver the product to the customer C and pays the consideration to the distribution service provider L. The distribution service provider L is a person who operates a distribution service provider terminal 5 to use the present service. Upon receipt of a delivery request for the product from the sender S, the distribution service provider L delivers the product to the customer C. The distribution service provider L evaluates the sender S using the present service.

The server 1 to be used by the service provider (not illustrated) executes various types of processing necessary for providing the present service in cooperation with the sender terminal 2, the distribution service provider terminal 5, and the customer terminal 6. That is, the service provider (not illustrated) can provide, using the server 1, the present service that manages various types of data to be transmitted and received mutually among the sender S, the distribution service provider L, and the customer C.

Specifically, the sender S requests the distribution service provider L to deliver the product to the customer C. Then, the sender S loads the product on a truck T of the distribution service provider L. At this time, the sender S uses the sender terminal 2 to transmit, to the server 1, actual record data including data (hereinafter, referred to as "loading waiting time data") showing time (loading waiting time of the distribution service provider L) required from loading of the product on the truck T to departure of the truck T, and data (hereinafter, referred to as "payment status data") showing a payment status of consideration to be paid to the distribution service provider L. In addition, the sender S uses the sender terminal 2 to transmit, to the server 1, data (hereinafter, referred to "verification data") for verifying the contents of the actual record data. The verification data includes, for example, as illustrated in FIG. 7, data of a photograph (photograph upon arrival) captured at a timing at which loading is started, and data of a photograph (photograph at the start of unloading) captured at a timing at which unloading is started.

The server 1 acquires the actual record data transmitted from the sender terminal 2. Here, for example, it is assumed that the loading waiting time is long and payment of the consideration is severely delayed. The server 1 calculates the evaluation for the sender S by the distribution service provider L on the basis of the actual record data, and presents the calculation result to the distribution service provider terminal 5. In this case, since the loading waiting time is long and payment of the consideration is severely delayed, the evaluation for the sender S becomes low. Thus, the distribution service provider L can make a business decision suitable for the actual condition on future relationship to the sender S by referring to the evaluation result presented to the distribution service provider terminal 5.

FIG. 7 illustrates an overview of management of the loading waiting time data by the present service.

In the present service, the data of a photograph (photograph upon arrival) captured at a timing at which loading is started, the data of a photograph (photograph at the start of unloading) captured at a timing at which unloading is started, and the like are used as the verification data. These pieces of photograph data are stored and managed, as the main data, in the main data DB 181 via an API. In addition, metadata relating to the main data is stored and managed in the blockchain B via the API. Furthermore, linking data linking the main data and the metadata is stored and managed in the main data DB 181 in association with the main data. Then, the main data and the metadata are presented, as the verification data linked by the linking data, to data users via the API. The metadata stored in the blockchain B can be prevented from being tampered, and therefore, if there is no discrepancy between the contents of the metadata and the contents of the verification data (main data), the accuracy of the contents of the verification data (main data) can be ensured by the metadata. This enables the verification data (main data) to be efficiently managed without causing the verification data (main data) to be stored in the blockchain B. As a result, the main data that is not tampered can be used as materials to be presented to public offices.

Figure 8:
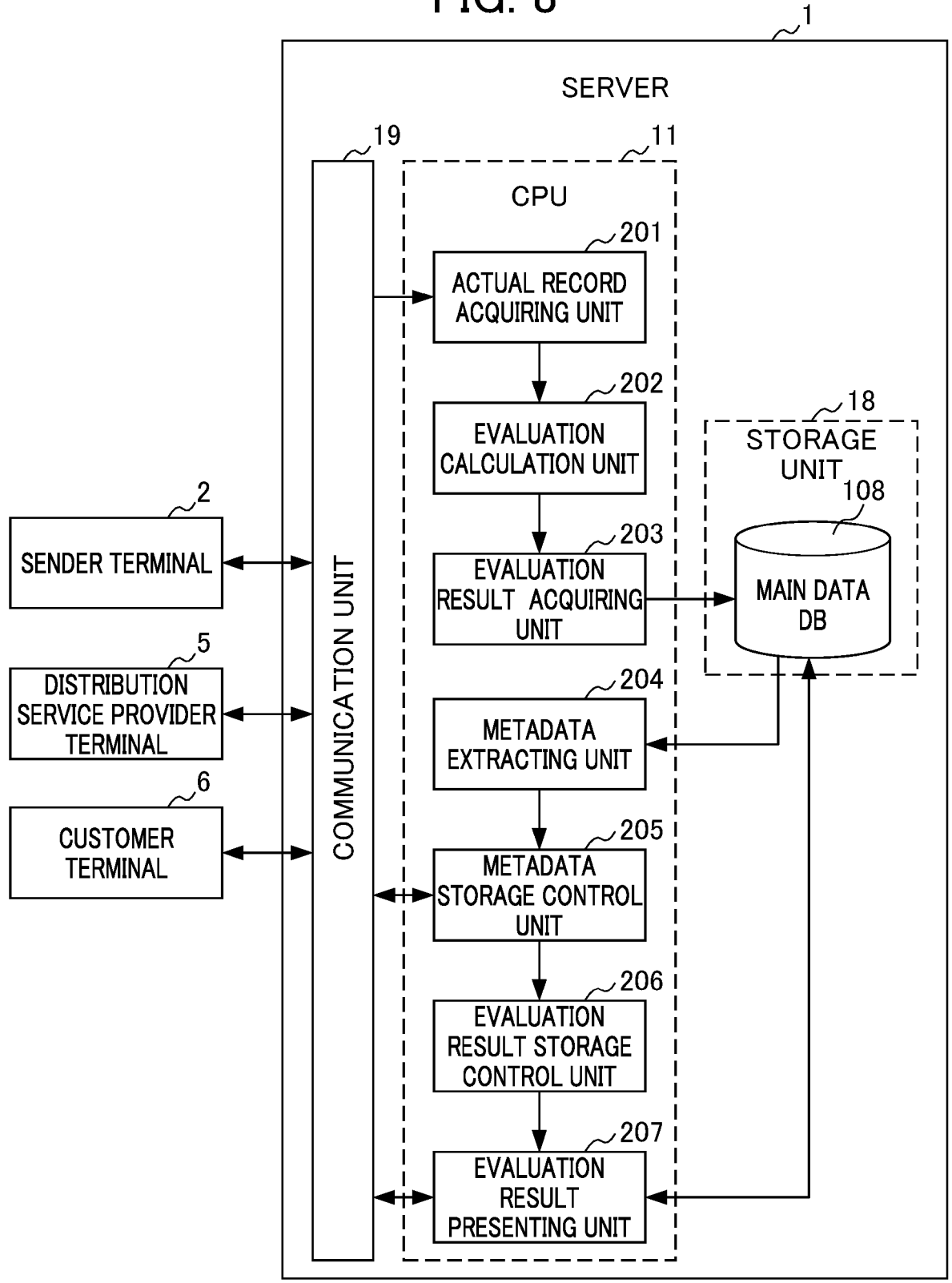
FIG. 8 is a functional block diagram illustrating a functional configuration for executing evaluation management processing in a functional configuration of the server included in the information processing system according to the second embodiment.

FIG. 8 is a functional block diagram illustrating a functional configuration for executing evaluation management processing in the functional configuration of the server included in the information processing system according to the second embodiment. When the evaluation management processing is executed in the functional configuration of the server 1, in a CPU 11 of the server 1, an actual record acquiring unit 201, an evaluation calculation unit 202, an evaluation result acquiring unit 203, a metadata extracting unit 204, a metadata storage control unit 205, an evaluation result storage control unit 206, and an evaluation result presenting unit 207 function as illustrated in FIG. 8.

The actual record acquiring unit 201 acquires actual record information transmitted from the sender terminal 2. Then, the actual record acquiring unit 201 provides the acquired actual record information to the evaluation calculation unit 202.

The evaluation calculation unit 202 calculates the evaluation for the sender S by the distribution service provider L on the basis of the actual record information presented from the actual record acquiring unit 201.

The evaluation result acquiring unit 203 acquires data (hereinafter, referred to as "evaluation result data") showing the evaluation result of the sender S calculated by the evaluation calculation unit 202.

The metadata extracting unit 204 extracts metadata relating to the evaluation result data acquired by the evaluation result acquiring unit 203. Specifically, the metadata extracting unit 204 extracts, as the metadata, information indicating a position and date and time at which the evaluation result data is created.

The metadata storage control unit 205 executes control to cause the metadata extracted by the metadata extracting unit 204 to be stored on the network N using the blockchain technology or the distributed ledger technology.

The evaluation result storage control unit 206 executes control to associate linking data linking the metadata stored on the network N and the evaluation result data with the evaluation result data and to store the linking data and the evaluation result data in the main data DB 181.

The evaluation result presenting unit 207 executes control to present, to the sender terminal 2 and the distribution service provider terminal 5, the evaluation calculation result presented from the evaluation calculation unit 202.

This enables the evaluation for the sender by the distribution service provider side to be implemented, which makes it possible to avoid the risk when the distribution service provider side trades with the sender. Then, the evaluation result and the data as a basis of the evaluation are properly managed.

Figure 9:
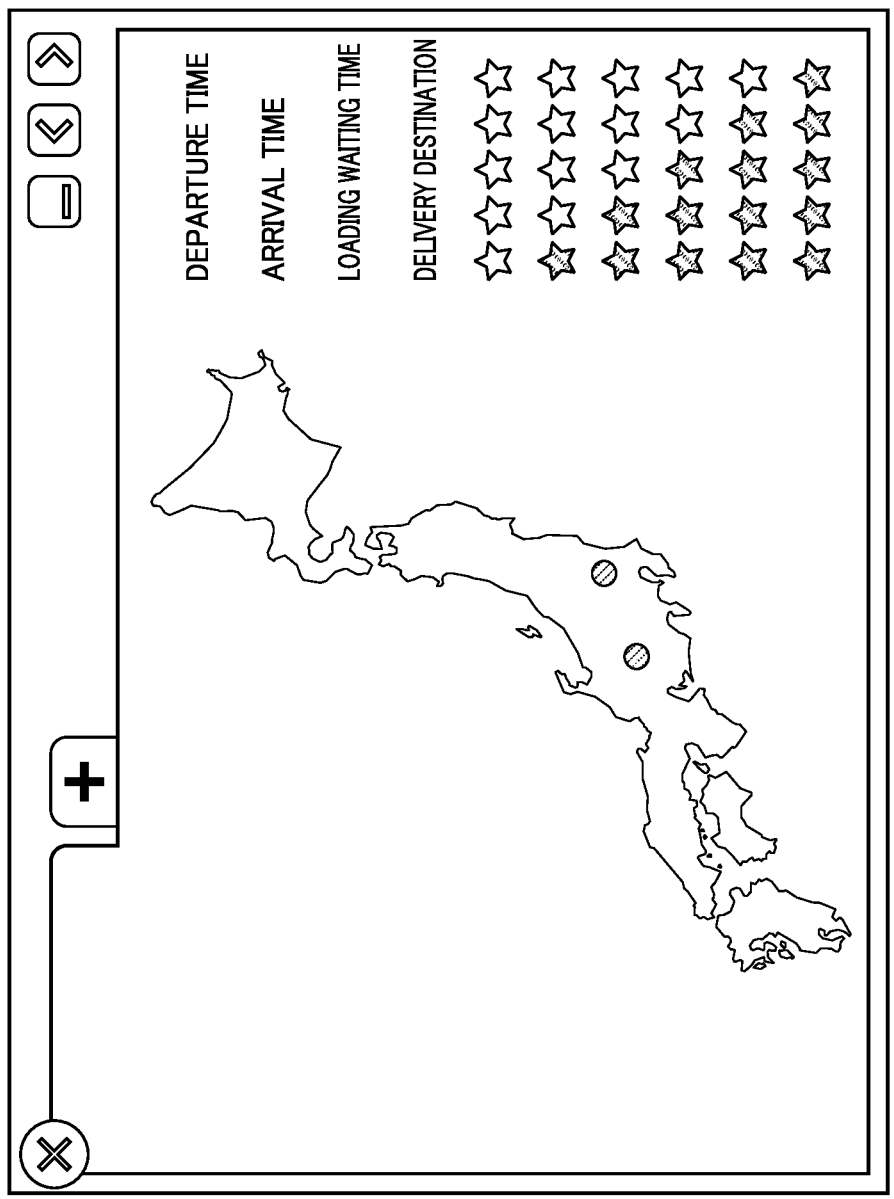
FIG. 9 is a diagram illustrating an example of a screen displayed on a terminal of a data user.

FIG. 9 is a diagram illustrating an example of a screen displayed on a terminal of a data user.

As illustrated in FIG. 9, an evaluation result for the sender S to be evaluated by the present service is shown on a terminal (e.g., the distribution service provider terminal 5) of the data user. Specifically, for each transaction, the evaluation result of the sender S is represented by the number of stars together with information about each of departure time, arrival time, loading waiting time, and a delivery destination. The distribution service provider L can make a business decision suitable for the actual condition on future relationship to the sender S to be evaluated, by referring to the screen displayed on the distribution service provider terminal 5.

Figure 10:
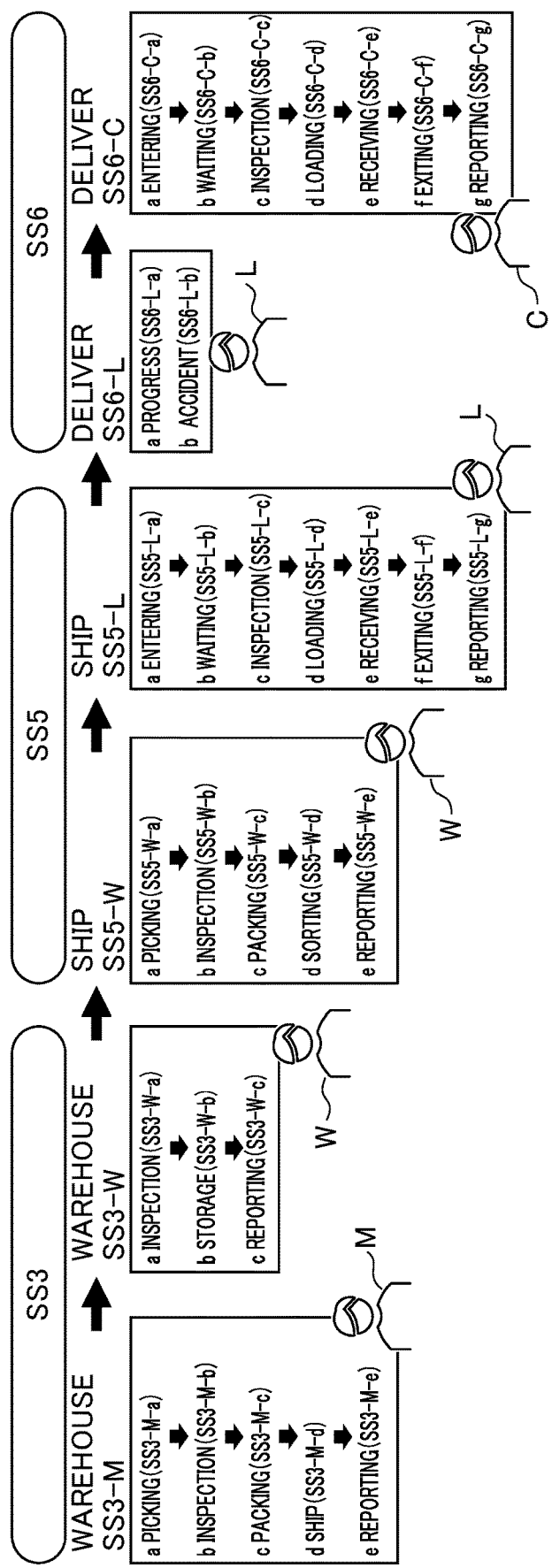
FIGS. 10A and 10B are diagrams for describing a specific example of application of the present service.

A specific example of application of the present service illustrated in FIG. 1 will be described further with reference to FIGS. 10 to 12. FIGS. 10A and 10B are a diagram for describing a specific example of application of the present service. FIG. 10A is a workflow diagram illustrating each step and each process in the present service. FIG. 10B is an explanatory diagram of quality determination.

Step SS3, step SS5, and step SS6 illustrated in FIG. 10A correspond to step SS3, step SS5, and step SS6 in steps SS1 to SS6 of FIG. 1, respectively. That is, step SS3 is a step in which the manufacturer M warehouses the manufactured product in the warehouse of the warehouse contractor W. Step SS5 is a step in which the warehouse contractor W ships the product stored in the warehouse to the distribution service provider L. Step SS6 is a step in which the distribution service provider L delivers the product to the customer C. For example, it is adopted that the step is represented by a as an identifier for step a (a includes SS3, SS5, and SS6 in FIG. 10A). That is, SS3 is adopted as an identifier of step SS3 indicating a warehousing step. In addition, SS5 is adopted as an identifier of step SS5 indicating a shipping step. Furthermore, SS6 is adopted as an identifier of step SS6 indicating a delivering step. Hereinafter, step SS3 indicating the warehousing step is conveniently referred to as warehousing SS3. In addition, step SS5 indicating the shipping step is conveniently referred to as shipping SS5. Furthermore, step SS6 indicating the delivering step is conveniently referred to as delivering SS6. The warehousing SS3 is divided into a step on the manufacturer M side (warehousing SS3-M) and a step on the warehouse contractor W side (warehousing SS3-W). Note that a hyphenated "M" conveniently refers to the step on the manufacturer M side. In addition, a hyphenated "W" conveniently refers to the step on the warehouse contractor W side. SS3-M is adopted as an identifier of the step on the manufacturer M side (warehousing SS3-M). In addition, SS3-W is adopted as an identifier of the step on the warehouse contractor W side (warehousing SS3-W). That is, as the identifier to be adopted herein, an identifier constructed by appending the hyphenated "M" as an identifier representing the manufacturer M to the identifier of step a is adopted. In addition, an identifier constructed by appending the hyphenated "W" as an identifier representing the warehouse contractor W to the identifier of step a is adopted. That is, as the identifiers herein, a-M and a-W are adopted. The shipping SS5 is divided into a step on the warehouse contractor W side (shipping SS5-W) and a step on the distribution service provider L side (shipping SS5-L). Note that, a hyphenated "W" conveniently refers to the step on the warehouse contractor W side. In addition, a hyphenated "L" conveniently refers to the step on the distribution service provider L side. SS5-W is adopted as an identifier of the step on the warehouse contractor W side (shipping SS5-W). In addition, SS5-L is adopted as an identifier of the step on the distribution service provider L side (shipping SS5-L). That is, as the identifier to be adopted herein, an identifier constructed by appending the hyphenated "W" as an identifier representing the warehouse contractor W to the identifier of step a is adopted. In addition, an identifier constructed by appending the hyphenated "L" as an identifier representing the distribution service provider L to the identifier of step a is adopted. That is, as the identifiers herein, a-W and a-L are adopted. The delivering SS6 is divided into a step on the distribution service provider L side (delivering SS6-L) and a step on the customer C side (delivering SS6-C). Note that, a hyphenated "L" conveniently refers to the step on the distribution service provider L side. In addition, a hyphenated "C" conveniently refers to the step on the customer C side. SS6-L is adopted as an identifier of the step on the distribution service provider L side (delivering SS6-L). In addition, SS6-C is adopted as an identifier of the step on the customer C side (delivering SS6-C). That is, as the identifier to be adopted herein, an identifier constructed by appending the hyphenated "L" as an identifier representing the distribution service provider L to the identifier of step a is adopted. In addition, an identifier constructed by appending the hyphenated "C" as an identifier representing the customer C to the identifier of step a is adopted. That is, as the identifiers herein, a-L and a-C are adopted.

In the step on the manufacturer M side (warehousing SS3-M), processes K (K in the warehousing SS3-M includes a to e) are performed as processes related to the warehousing. A process a in the processes K related to the warehousing represents a picking process. Here, SS3-M-a is adopted as an identifier including the process a related to the picking. That is, an identifier constructed by appending the hyphenated "a" as an identifier representing the process a related to the picking to the identifier of the warehousing SS3-M is adopted. That is, α-M-a is adopted as the identifier including the process a related to the picking. In addition, a process b in the processes K related to warehousing represents an inspection process. Here, SS3-M-b is adopted as an identifier including the process b related to the inspection. That is, an identifier constructed by appending the hyphenated "b" as an identifier representing the process b related to the inspection to the identifier of the warehousing SS3-M is adopted. That is, α-M-b is adopted as the identifier including the process b related to the inspection. In addition, a process c in the processes K related to the warehousing represents a packing process. Here, SS3-M-c is adopted as an identifier including the process c related to the packing. That is, an identifier constructed by appending the hyphenated "c" as an identifier representing the process c related to the packing to the identifier of the warehousing SS3-M is adopted. That is, α-M-c is adopted as the identifier including the process c related to the packing. Furthermore, a process d in the processes K related to the warehousing represents a shipping process. Here, SS3-M-d is adopted as an identifier including the process d related to the shipping. That is, an identifier constructed by appending the hyphenated "d" as an identifier representing the process d related to the shipping to the identifier of the warehousing SS3-M is adopted. That is, α-M-d is adopted as the identifier including the process d related to the shipping. Furthermore, a process e in the processes K related to the warehousing represents a reporting process. Here, SS3-M-e is adopted as an identifier including the process e related to the reporting. That is, an identifier constructed by appending the hyphenated "e" as an identifier representing the process e related to the reporting to the identifier of the warehousing SS3-M is adopted. That is, α-M-e is adopted as the identifier including the process e related to the reporting.

In the step on the warehouse contractor W side (warehousing SS3-W), processes K (K in the warehousing SS3-W includes a to c) are performed as processes related to the warehousing. A process a in the processes K related to the warehousing represents an inspection process. Here, SS3-W-a is adopted as an identifier including the process a related to the inspection. That is, an identifier constructed by appending the hyphenated "a" as an identifier representing the process a related to the inspection to the identifier of the warehousing SS3-W is adopted. That is, a-W-a is adopted as the identifier including the process a related to the inspection. In addition, a process b in the processes K related to the warehousing represents a storing process. Here, SS3-W-b is adopted as an identifier including the process b related to the storing. That is, an identifier constructed by appending the hyphenated "b" as an identifier representing the process b related to the storing to the identifier of the warehousing SS3-W is adopted. That is, α-W-b is adopted as the identifier including the process b related to the storing. In addition, a process c in the processes K related to the warehousing represents a reporting process. Here, SS3-W-c is adopted as an identifier including the process c related to the reporting. That is, an identifier constructed by appending the hyphenated "c" as an identifier representing the process c related to the reporting to the identifier of the warehousing SS3-W is adopted. That is, α-M-c is adopted as the identifier including the process c related to the reporting.

The shipping SS5 in which the identifier of the step a is SS5 is not described herein, but the identifier represented in the similar manner to the above-described warehousing SS3 is adopted in the shipping SS5. Also in the delivering SS6 in which the identifier of the step a is SS6, the identifier represented in the similar manner to the above-described warehousing SS3 is adopted.

The quality determination illustrated in FIG. 10B is made by determining whether the processes have consistency or inconsistency with respect to the above-described processes K. In the case of consistency, for example, in the inspection process, "inspection determination/satisfactory" is displayed (see FIG. 11). The identifier in the case of consistency is constructed by appending hyphenated "1" to the identifier of the process K (which will be described later). On the other hand, in the case of inconsistency, although not particularly illustrated in the figure, for example, in the inspection process, "inspection determination/defective" is displayed. The identifier in the case of inconsistency is constructed by appending hyphenated "2" to the identifier of the process K (not illustrated). The identifier constructed by appending the hyphenated "1" or "2" to the identifier of the process K is used as an identifier indicating a work progress result (which will be described later). For example, in FIG. 11, the identifier constructed by appending the hyphenated "1" is illustrated as the work progress result (description of FIG. 11 will be made later).

While describing with reference to FIGS. 10A and 10B, each of the above-described identifiers is an identifier usable as the metadata to be stored in the blockchain B.

Figure 11:
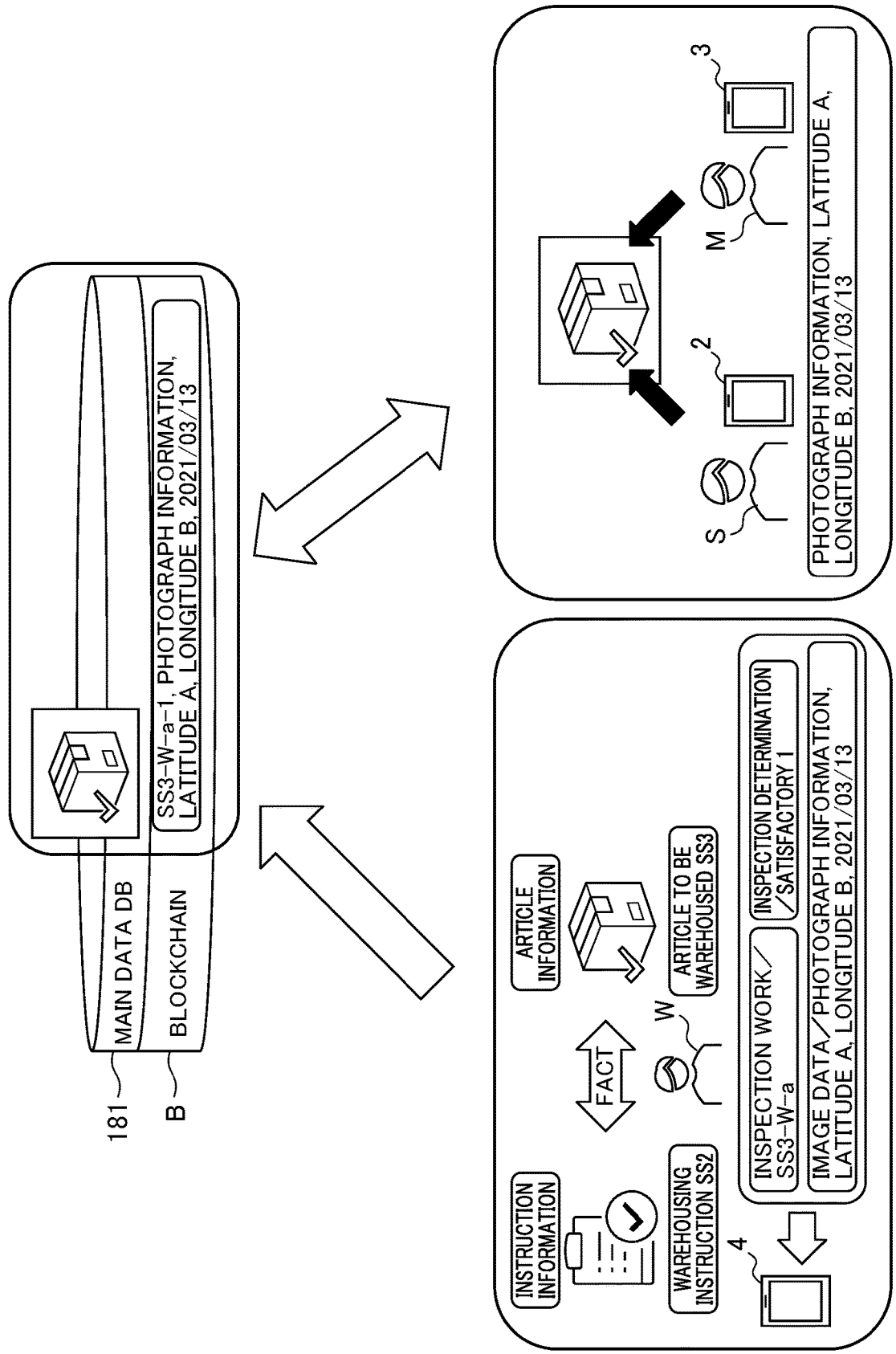
FIG. 11 is a diagram for describing a specific example of application of the present service or a schematic diagram for describing an example of a warehousing step in a flow of the present service.

FIG. 11 is a diagram for describing a specific example of application of the present service illustrated in FIG. 1. Specifically, FIG. 11 is a schematic diagram for describing an example of the warehousing SS3 as the warehousing process, in the flow of the present service. In the description of FIG. 11, the step a is, for example, the step (warehousing SS3-W) on the warehouse contractor W side. In addition, the process K is, for example, the process a (inspection process). The quality determination is made that the process has consistency (satisfactory), for example.

The warehouse contractor W previously acquires, from the sender terminal 2 of the sender S, instruction information of the warehousing instruction and article information using the warehouse contractor terminal 4. Note that in FIG. 11, the instruction in step SS2 of FIG. 1 conveniently refers to a warehousing instruction SS2. Examples of the above-described instruction information include an instruction number, various forms, and data from an instruction system (as an example). Examples of the article information include a product code, a product name, standards, quantity per case, outer packaging, quantity, weight, size, manufacturing data, expiration date, a storage temperature zone, smell, quality conditions, and a handling method (as an example). The warehouse contractor W uses the warehouse contractor terminal 4 to inspects the article to be warehoused received from the manufacturer M as to whether the instruction information of the warehousing instruction SS2 and the article information are consistent with the facts. In other words, the quality determination is made by determining whether the inspection process (process a) has consistency or inconsistency. Note that in FIG. 11, the article to be warehoused in step SS3 of FIG. 1 conveniently refers to an article to be warehoused SS3. When the inspection process (process a) is completed, "SS3-W-a-1" is recorded, as the work progress result, in the warehouse contractor terminal 4. The identifier "SS3-W-a-1" as the work progress result indicates that the inspection process (process a) in the step on the warehouse contractor W side (warehousing SS3-W) is completed and the process has consistency. After "SS3-W-a-1" is recorded in the warehouse contractor terminal 4, the warehouse contractor W uses the warehouse contractor terminal 4 to store, in the blockchain B, the information in which the work progress result "SS3-W-a-1" is associated with the location and date and time of the image data of the article to be warehoused SS3, with an ID to prevent tampering. As illustrated in FIG. 11, "SS3-W-a-1, photograph information, latitude A, longitude B, 2021/03/13" are stored, as the metadata, in the blockchain B. At the same time as the storage, the image information relating to the information in which the work progress result "SS3-W-a-1" is associated with the location and date and time of the image data of the article to be warehoused SS3 is stored, as the main data, in the main data DB 181 external to the blockchain B. Note that if there is an abnormality, an alert is emitted. That is, if there is an abnormality, an alert is emitted, via, for example, a terminal (e.g., the sender terminal 2 and the manufacturer terminal 3 in FIG. 11), to persons (e.g., the sender S and the manufacturer M in FIG. 11) permitted to view the information stored in the blockchain B. The persons to which the alert is emitted are recognized as being person involved, and can confirm the image.

In the specific example of application of the present service illustrated in FIG. 11, the above-described persons involved can share the information by the blockchain B. In the specific example of application of the present service illustrated in FIG. 11, the accuracy of the contents of the main data can be ensured by the metadata. That is, the information in which the work progress result "SS3-W-a-1" is associated with the location and date and time of the image data of the article to be warehoused SS3 is stored, as the metadata, in the blockchain B, which makes it difficult to tamper the stored information, and therefore, if there is no discrepancy between the contents of the metadata and the contents of the main data, the accuracy of the contents of the main data can be ensured by the metadata. Accordingly, in the specific example of application of the present service illustrated in FIG. 11, the main data can be efficiently managed in the same manner in the first embodiment. In the specific example of application of the present service illustrated in FIG. 11, the information can be shared as described above, which enables the above-described persons involved to confirm the information instantaneously.

Figure 12:
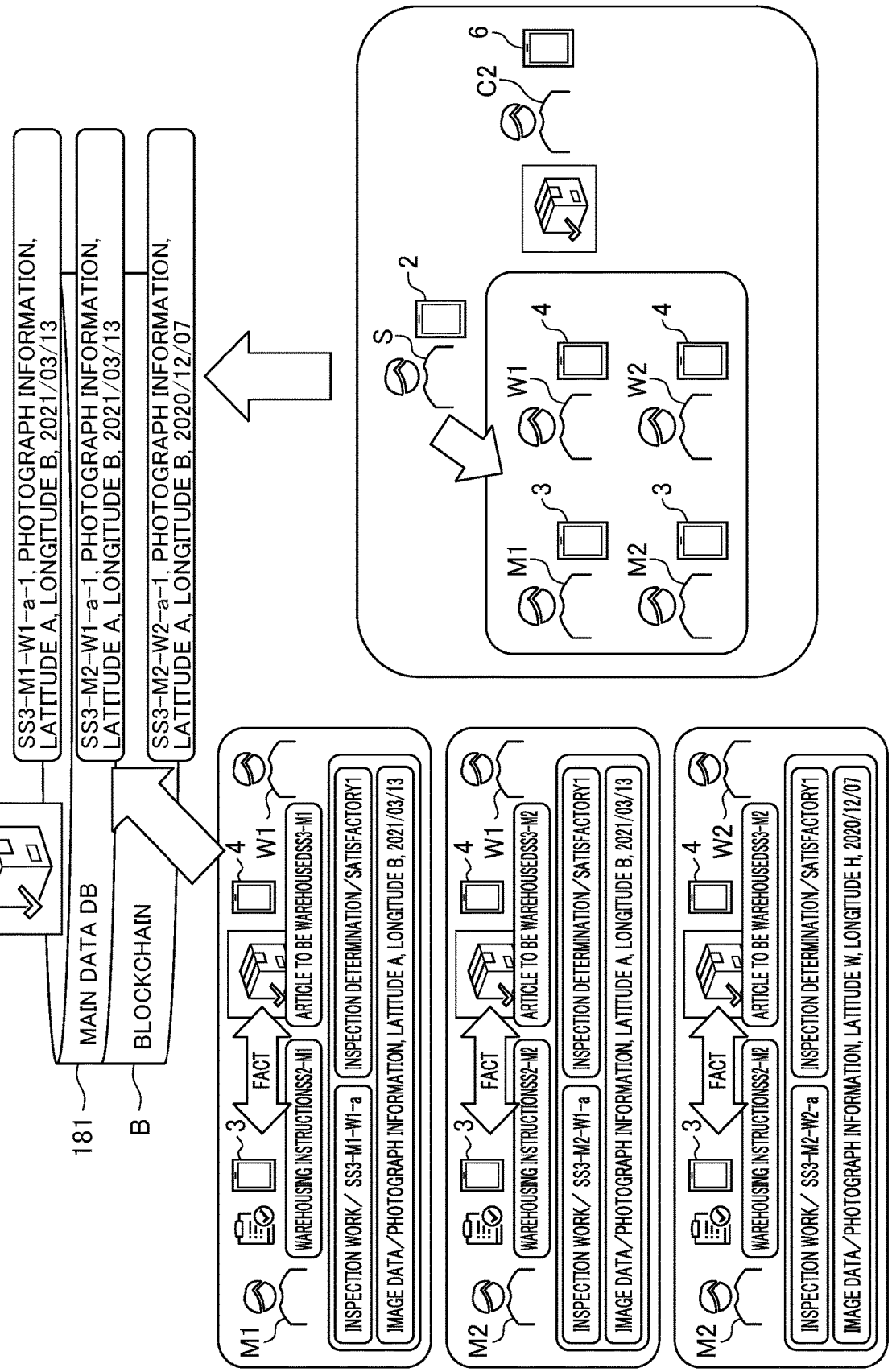
FIG. 12 is a diagram for describing a further specific example of application of the present service with respect to FIG. 11, or a schematic diagram for describing an example of a warehousing step in the flow of the present service.

FIG. 12 is a diagram for describing a further specific example of application of the present service with respect to FIG. 11. FIG. 12 is a schematic diagram for describing an example of SS3 as the warehousing process, in the flow of the present service. Although not particularly illustrated in the figure, in the following description, there are present, for example, two manufacturers M1 and M2 who are the manufacturers M of FIG. 1, two warehouse contractors W1 and W2 who are the warehouse contractors W of FIG. 1, two distribution service providers L1 and L2 who are the distribution service providers L of FIG. 1, and two customers C1 and C2 who are the customers C (the number is an example). In the following description, the sender S uses the sender terminal 2 to cause the manufacturers M1 and M2 to manufacture the same articles (products). The manufactured articles are managed by the warehouse contractors W1 and W2 at two places of the Kanto area and the Kansai area. The articles shipped from the warehouses are to be delivered to the customers C1 and C2, respectively. Note that FIG. 12 shows an example of a case where upon receipt of a claim for damage from the customer C2, the sender S investigates the cause in cooperation with the manufacturers M1 and M2 and the warehouse contractors W1 and W2.

In FIG. 12, the warehouse contractor W1 uses the warehouse contractor terminal 4 to inspect the article to be warehoused SS3-M1 received from the manufacturer M1 as to whether the instruction information relating to the warehousing instruction SS2-M1 and the article information are consistent with the facts. In other words, the warehouse contractor W1 makes the quality determination by determining whether the inspection process (process a) has consistency or inconsistency (determining whether it is satisfactory or defective). Note that the inspection process (process a) is basically the same as the above-described flow with reference to FIG. 11, and thus the detailed description is omitted herein. The warehouse contractor W1 uses the warehouse contractor terminal 4 to inspect the article to be warehoused SS3-M2 received from the manufacturer M2 as to whether the instruction information relating to the warehousing instruction SS2-M2 and the article information are consistent with the facts. When the inspection is completed in the state in which the inspection process (process a) has consistency (as being satisfactory), "SS3-M1-W1-*a*-1" and "SS3-M2-W1-*a*-1" are recorded, as the work progress results, in the warehouse contractor terminal 4 of the warehouse contractor W1. The warehouse contractor W1 uses the warehouse contractor terminal 4 to store, in the blockchain B, the information in which the work progress result "SS3-M1-W1-*a*-1" is associated with the location and date and time of the image data of the article to be warehoused SS3-M1, with an ID to prevent tampering. In addition, the warehouse contractor W1 stores, in the blockchain B, the information in which the work progress result "SS3-M2-W1-*a*-1" is associated with the location and date and time of the image data of the article to be warehoused SS3-M2, with an ID to prevent tampering. That is, as illustrated in FIG. 12, "SS3-M1-W1-*a*-1, photograph information, latitude A, longitude B, 2021/03/13" and "SS3-M2-W1-*a*-1, photograph information, latitude A, longitude B, 2021/03/13" are stored, as the metadata, in the blockchain B. At the same time as the storage, the image information relating to the information in which the work progress result "SS3-M1-W1-*a*-1" is associated with the location and date and time of the image data of the article to be warehoused SS3-M1 is stored, as the main data, in the main data DB 181 external to the blockchain B. In addition, the image information relating to the information in which the work progress result "SS3-M2-W1-*a*-1" is associated with the location and date and time of the image data of the article to be warehoused SS3-M2 is stored, as the main data, in the main data DB 181.

On the other hand, the warehouse contractor W2 uses the warehouse contractor terminal 4 to inspect the article to be warehoused SS3-M2 received from the manufacturer M2 as to whether the instruction information relating to the warehousing instruction SS2-M2 and the article information are consistent with the facts. When the inspection is completed in the state in which the inspection process (process a) has consistency (as being satisfactory), "SS3-M2-W2-*a*-1" is recorded, as the work progress result, in the warehouse contractor terminal 4 of the warehouse contractor W2. The warehouse contractor W2 uses the warehouse contractor terminal 4 to store, in the blockchain B, the information in which the work progress result "SS3-M2-W2-*a*-1" is associated with the location and date and time of the image data of the article to be warehoused SS3-M2, with an ID to prevent tampering. That is, as illustrated in FIG. 12, "SS3-M2-W2-*a*-1, photograph information, latitude W, longitude H, 2020/12/07" is stored, as the metadata, in the blockchain B. At the same time as the storage, the image information relating to the information in which the work progress result "SS3-M2-W2-*a*-1" is associated with the location and date and time of the image data of the article to be warehoused SS3-M2 is stored, as the main data, in the main data DB 181 external to the blockchain B.

In the specific example of application of the present service illustrated in FIG. 12, the information in which the work progress result "SS3-M1-W1-*a*-1" is associated with the location and date and time of the image data of the article to be warehoused SS3-M1 is stored, as the metadata and the shared information, in the blockchain B. In addition, in the specific example of application of the present service illustrated in FIG. 12, the information in which the work progress result "SS3-M2-W1-*a*-1" is associated with the location and date and time of the image data of the article to be warehoused SS3-M2 is stored, as the metadata and the shared information, in the blockchain B. In addition, in the specific example of application of the present service illustrated in FIG. 12, the information in which the work progress result "SS3-M2-W2-*a*-1" is associated with the location and date and time of the image data of the article to be warehoused SS3-M2 is stored, as the metadata and the shared information, in the blockchain B. Using these pieces of shared information enables the sender S to verify whether there has been a problem in article management process of the warehouse contractors W1 and W2 or in the manufacturing process of the manufacturers M and M2, immediately upon receipt of an inquiry (e.g., a claim for damage) from the customer C2.

In the specific example of application of the present service, using these pieces of shared information in the blockchain B enables the sender S to instantaneously confirm which manufacturer M the article (product) delivered to the customer C2 was manufactured by, which warehouse contractor W it was shipped from, and which distribution service provider L delivered it. In addition, the sender S can instantaneously confirm the investigation of the article (product) by the blockchain B without inquiring of the persons involved. The above-described information sharing not only can, as a matter of course, lead to improvement in quality and improvement in business performance, but also can ensure the confidence from the customer C by quick response.

Although an embodiment of the information processing device of the present invention has been described above, the present invention is limited to the present embodiment described above. Furthermore, the effects described in the present embodiment are merely a list of the most preferable effects resulting from the present invention, and the effects of the present invention are not limited to those described in the present invention.

For example, in the above-described embodiments of FIGS. 2 and 7, the information about the position and the date and time is mentioned as the information included in the metadata, but the present invention is not limited thereto. In FIG. 11, "SS3-W-*a*-1, photograph information, latitude A, longitude B, 2021/03/13" is mentioned as an example of the metadata, and in FIG. 12, "SS3-M1-W1-*a*-1, photograph information, latitude A, longitude B, 2021/03/13", "SS3-M2-W1-*a*-1, photograph information, latitude A, longitude B, 2021/03/13" and "SS3-M2-W2-*a*-1, photograph information, latitude W, longitude H, 2021/12/07" are mentioned as examples of the metadata, but the present invention is not limited thereto. Note that in the step on the distribution service provider L side (shipping SS5-L) of FIG. 10A, when the case where the inspection process (process c) has consistency is mentioned as an example, the identifier and the metadata are represented as SS5-L-c-1. The metadata includes not only, as a matter of course, the information created by the image format but also the information input via the terminal, for example, by the method different from that of the format of the image data. The metadata includes not only the information by which the accuracy of the contents of the main data can be ensured, but also any information relating to the main data.

As the metadata, encryption key information illustrated in FIG. 13 is also mentioned as an example of the metadata. FIG. 13 is a diagram illustrating further specific examples of main data and metadata to be managed by the present service. As illustrated in FIG. 13, the image data is encrypted to be stored, as the encryption data, in the main data DB 181. In contrast, the encryption key used when the image data is encrypted is stored in the blockchain B. The data users decrypt the encryption data in the main data DB 181 using the encryption key in the blockchain B, thereby making it possible to confirm the encryption data as the image data. Note that the API in FIG. 13 is the same as the application programming interface (API) described in FIG. 2.

The metadata includes not only the information reminded generally but also various kinds of information.

For example, in the above-described embodiment, the actual record information employs a predetermined package loading time and a payment status of consideration, but the present invention is not particularly limited thereto. The actual record information may employ any other actual record information that can be linked to the evaluation for the sender S by the distribution service provider L In the above-described evaluation calculation processing, as the "actual record information" used for the evaluation for the sender S, the information input to the sender terminal 2 by the sender S is adopted, but the information input to the distribution service provider terminal 5 by the distribution service provider L may be adopted. That is, the distribution service provider L can use the distribution service provider terminal 5 to evaluate the sender S on the basis of the input of the "actual record information".

In the example of FIG. 2, the method of managing a slip as the data of captured image is mentioned as the method of managing a slip, but the present invention is not limited to the method, and for example, electronic data of a slip may be managed. A form of the "main data" is not limited to a particular form, and may be any data that can extract the metadata.

In the above-described embodiments, the linking data is present, but is not particularly required. That is, the data may be in any form in which main data is linked with metadata relating to the main data, and the metadata is stored on a predetermined network using the blockchain technology or the distributed ledger technology, whereas the main data is stored in a predetermined storage medium different from a storage medium of the metadata.

Moreover, the hardware configuration illustrated in FIG. 4 is merely an example for achieving the object of the present invention, and the present invention is not particularly limited to the example.

In other words, the functional configuration in FIGS. 5 and 8 is merely an example, and the present invention is not particularly limited to the example. That is, as long as the information processing system has the function capable of executing a series of processing described above as a whole, a functional block used to achieve this function is not particularly limited to the examples of FIGS. 5 and 8. Furthermore, the location of the functional block is not particularly limited to that in FIGS. 5 and 8, but may be arbitrary. For example, the functional block of the server 1 may be handed over to the sender terminal 2, the distribution service provider terminal 5, or the like. In addition, the functional block of the server 1 may be handed over to the sender terminal 2, the distribution service provider terminal 5, or the like. In addition, one functional block may be configured with hardware alone, software alone, or a combination thereof.

For example, when a series of processing is executed by software, a program that configures the software is installed on a computer or the like from a network or a recording medium. The computer may be a computer which is incorporated in dedicated hardware. Alternatively, the computer may be a computer capable of executing various types of functions by installing various types of programs, such as a general-purpose smart phone or personal computer other than a server.

For example, the recording medium containing such programs is not only configured with the not-illustrated removable medium which is distributed separately from a device main body to provide the programs to each user but also a recording medium or the like which is provided to each user in a state in which it is installed in the device main body in advance.

In this specification, steps of describing the programs to be recorded on the recording medium include not only, as a matter of course, processing performed in time series according to its order but also processing executed in parallel or individually even when the processing is not necessarily in time sequence. Furthermore, in the present specification, the term "system" means an overall device including a plurality of devices or a plurality of units.

The recording medium containing such programs is not only configured with the removable medium 30 of FIG. 2 which is distributed separately from a device main body to provide the programs to each user but also a recording medium or the like which is provided to each user in a state in which it is installed in the device main body in advance. Examples of the removable medium 30 include a magnetic disk (including a floppy disk), an optical disc, and a magneto-optical disk. Examples of the optical disc include a compact disk-read only memory (CD-ROM), and a digital versatile disk (DVD). The magneto-optical disk includes a mini-disk (MD), or the like. In addition, the recording medium provided to each user in the state in which it is installed in the device main body in advance is configured with, for example, the ROM 12 of FIG. 2 in which the programs are recorded, the hard disk included in the storage unit 18 of FIG. 3, or the like.

In this specification, steps of describing the programs to be recorded on the recording medium include not only, as a matter of course, processing performed in time series according to its order but also processing executed in parallel or individually even when the processing is not necessarily in time sequence. Furthermore, in the present specification, the term "system" means an overall device including a plurality of devices or a plurality of units.

In summary, the information processing device to which the present invention is applied is sufficient if the present invention has the following configuration, and various embodiments may be taken. That is, the information processing device to which the present invention is applied (for example, the server 1 in FIG. 1) includes a first storage control unit (e.g., the metadata storage control unit 103 of FIG. 5) that executes control to cause metadata relating to main data (e.g., photograph data of FIG. 2) to be stored on a predetermined network (e.g., the network N of FIG. 3) using blockchain technology or distributed ledger technology, and a second storage control unit (e.g., the main data storage control unit 104 of FIG. 5) that executes control to associate linking data (e.g., the linking data of FIG. 1) linking the metadata stored on the predetermined network and the main data with the main data and to store the linking data and the main data in the predetermined storage medium (e.g., the main data DB 181 of FIG. 5).

This enables the metadata relating to the main data to be stored on the predetermined network, and the main data to be stored in the predetermined storage medium, whereby the linking data linking the metadata and the main data is managed in association with the main data. As a result, the metadata stored on the predetermined network can be prevented from being tampered, and therefore, if there is no discrepancy between the contents of the metadata and the contents of the main data, the accuracy of the contents of the main data can be ensured by the metadata. This enables the main data to be efficiently managed without causing the main data to be stored on the predetermined network.

In addition, the information processing device to which the present invention is applied (for example, the server 1 in FIG. 1) includes a first storage control unit (e.g., the metadata storage control unit 103 of FIG. 5) that links main data (e.g., photograph data of FIG. 11) and metadata (e.g., "SS3-W-a-1, photograph information, latitude A, longitude B, 2021/03/13) relating to the main data and executes control to cause the metadata to be stored on a predetermined network using blockchain technology or distributed ledger technology, and a second storage control unit (e.g., the main data storage control unit 104 of FIG. 5) that executes control to cause the main data to be stored in a predetermined storage medium (e.g., the main data DB 181 of FIG. 11) different from a storage medium of the metadata.

In this way, the main data and the metadata relating to the main data are linked to each other, the metadata is stored on the predetermined network, and the main data is stored and managed in the predetermined storage medium. As a result, the metadata stored on the predetermined network can be prevented from being tampered, and therefore, if there is no discrepancy between the contents of the metadata and the contents of the main data, the accuracy of the contents of the main data can be ensured by the metadata. This enables the main data to be efficiently managed without causing the main data to be stored on the predetermined network. Since the metadata stored on the predetermined network can be information-shared, the persons (persons involved) permitted to view the information can confirm the information instantaneously, which can lead to improvement in quality and improvement in business performance, for example.

When acquiring, as the main data, data showing contents of at least one transaction selected from a transaction related to an order for a product, a transaction related to an instruction to warehouse the product in a warehouse, a transaction related to an instruction to ship the product from the warehouse, and a transaction related to a request to deliver the product to a delivery destination, the data being created when making the at least one transaction, the first storage control unit may execute control to cause the metadata relating to the main data to be stored on the predetermined network using the blockchain technology or the distributed ledger technology.

In this way, the metadata relating to the data showing the contents of a transaction related to an order for a product, a transaction related to an instruction to warehouse the product in a warehouse, a transaction related to an instruction to ship the product from the warehouse, and a transaction related to a request to deliver the product to a delivery destination is stored on the predetermined network using the blockchain technology or the distributed ledger technology. As a result, the data to be exchanged in all transactions performed between an order for a product received by the sender from the customer and actual delivery of the product can be accurately managed.

The first storage control unit executes control to cause the metadata to be stored on the predetermined network using the blockchain technology or the distributed ledger technology, the metadata relating to each of the main data including at least one selected from data of an image obtained by imaging a slip describing contents of a predetermined transaction and electronic data showing contents of the slip, and data of an image obtained by imaging a scene where the transaction is performed.

In this way, the metadata relating to the main data of the electronic data including photograph data can be accurately managed on the network.

In the metadata, at least one selected from information indicating a position where the main data is created (e.g., latitude and longitude) and information indicating date and time (e.g., a time stamp) may be included.

In this way, the main data can be accurately managed on the basis of the information indicating the position and the information indicating the date and time which are included in the metadata.

Furthermore, in the metadata, information indicating a work progress result of a process in a step in which the main data is created can be further included.

In this way, the main data can be accurately managed on the basis of the information indicating the work progress result which is included in the metadata.

Furthermore, in the metadata, information for making quality determination as to whether the process has consistency or inconsistency can be further included.

In this way, the main data can be accurately managed on the basis of the information for making the quality determination which is included in the metadata.

EXPLANATION OF REFERENCE NUMERALS

1 . . . Server, 2 . . . Sender terminal, 3 . . . Manufacturer terminal, 4 . . . Warehouse contractor terminal, 5 . . . Distribution service provider terminal, 6 . . . Customer terminal, 11 . . . CPU, 12 . . . ROM, 13 . . . RAM, 14 . . . Bus, 15 . . . Input/output interface, 16 . . . Display unit, 17 . . . Input unit, 18 . . . Storage unit, 19 . . . Communication unit, 20 . . . Drive, 30 . . . Removable medium, 101 . . . Main data acquiring unit, 102 . . . Metadata extracting unit, 103 . . . Metadata storage control unit, 104 . . . Main data storage control unit, 181 . . . Main data DB, 201 . . . Actual record acquiring unit, 202 . . . Evaluation calculation unit, 203 . . . Evaluation result acquiring unit, 204 . . . Metadata extracting unit, 205 . . . Metadata storage control unit, 206 . . . Evaluation result storage control unit, 207 . . . Evaluation result presenting unit, B . . . Blockchain, S . . . Sender, M . . . Manufacturer, W . . . Warehouse contractor, L . . . Distribution service provider, C . . . Customer, SS . . . Each step, N . . . Network

The invention claimed is:

1. An information processing system, for delivering predetermined products to customers that manages data related to each work content exchanged with at least some of a plurality of workers, including the customer, comprising:
   a processor; and
   a memory coupled to the processor, wherein the memory comprises instructions, which, when executed by the processor, is configured to perform a method comprising:
   executing a first control to store metadata relating to main data on a predetermined network using blockchain technology or distributed ledger technology,
      wherein the main data, having a first volume, is stored in the memory and is used or prepared by a predetermined worker for work in a predetermined step,
      wherein the predetermined step includes at least loading and unloading operations for the movement of the predetermined products, the main data includes verification data necessary for proving waiting time which includes at least the time required for the at least loading and unloading operations, and
      wherein the metadata, having a second volume smaller than the first volume, including information that can identify the predetermined step and the predetermined worker, to allow at least the verification data to be shared among the plurality of worker;
   executing a second control that causes linking data linking the metadata and the main data to be stored in the memory in association with the main data; and
   executing a third control such that the main data and the metadata, including the verification data linked by the linking data, are provided to data users.

2. The information processing system according to claim 1, wherein
   when acquiring, as the main data, data showing contents of at least one transaction selected from a transaction related to an order for a product, a transaction related to an instruction to warehouse the product in a warehouse, a transaction related to an instruction to ship the product from the warehouse, and a transaction related to a request to deliver the product to a delivery destination, the data being created when making the at least one transaction, as the first control, control is executed to cause the metadata relating to the main data to be stored on the predetermined network using the blockchain technology or the distributed ledger technology.

3. The information processing system according to claim 1, wherein as the first control, control is executed to cause the metadata to be stored on the predetermined network using the blockchain technology or the distributed ledger technology, the metadata relating to each of the main data including at least one selected from data of an image obtained by imaging a slip describing contents of a predetermined transaction and electronic data showing contents of the slip, and data of an image obtained by imaging a scene where the transaction is performed.

4. The information processing system according to claim 1, wherein in the metadata, at least one selected from information indicating a position where the main data is created (e.g., latitude and longitude) and information indicating date and time (e.g., a time stamp) is included.

5. The information processing system according to claim 4, wherein in the metadata, information indicating a work progress result of a process in a step in which the main data is created is further included.

6. The information processing system according to claim 5, wherein in the metadata, information for making quality determination as to whether the process has consistency or inconsistency is further included.

7. An information processing system, for delivering predetermined products to customers that manages data related to each work content exchanged with at least some of a plurality of workers, including the customer, comprising:

a processor; and a memory coupled to the processor, wherein the memory comprises instructions, which, when executed by the processor, is configured to perform a method comprising:

executing a first control to store metadata relating to main data on a predetermined network using blockchain technology or distributed ledger technology, wherein the main data, having a first volume, is stored in the memory and is used or prepared by a predetermined worker for work in a predetermined step, wherein the predetermined step includes at least loading and unloading operations for the movement of the predetermined products, the main data includes verification data necessary for proving waiting time which includes at least the time required for the at least loading and unloading operations, and wherein the metadata, having a second volume smaller than the first volume, including information that can identify the predetermined step and the predetermined worker, to allow at least the verification data to be shared among the plurality of worker;

executing a second control that causes linking data linking the metadata and the main data to be stored in the memory in association with the main data; and executing a third control such that the main data and the metadata, including the verification data linked by the linking data, are provided to data users operating at least one of a sender terminal, a manufacturer terminal, a warehouse contractor terminal, a service provider terminal, and a customer terminal, wherein when acquiring, as the main data, data showing contents of at least one transaction selected from a transaction related to an order for a product, a transaction related to an instruction to warehouse the product in a warehouse, a transaction related to an instruction to ship the product from the warehouse, and a transaction related to a request to deliver the product to a delivery destination, the data being created when making the at least one transaction, as the first control, control is executed to cause the metadata relating to the main data to be stored on the predetermined network using the blockchain technology or the distributed ledger technology.

8. The information processing system according to claim 7, wherein as the first control, control is executed to cause the metadata to be stored on the predetermined network using the blockchain technology or the distributed ledger technology, the metadata relating to each of the main data including at least one selected from data of an image obtained by imaging a slip describing contents of a predetermined transaction and electronic data showing contents of the slip, and data of an image obtained by imaging a scene where the transaction is performed.

9. The information processing system according to claim 7, wherein in the metadata, at least one selected from information indicating a position where the main data is created (e.g., latitude and longitude) and information indicating date and time (e.g., a time stamp) is included.

10. The information processing system according to claim 9, wherein in the metadata, information indicating a work progress result of a process in a step in which the main data is created is further included.

11. The information processing system according to claim 10, wherein in the metadata, information for making quality determination as to whether the process has consistency or inconsistency is further included.

* * * * *